United States Patent
Erk et al.

(10) Patent No.: US 10,526,212 B2
(45) Date of Patent: Jan. 7, 2020

(54) MIXED TRANSITION METAL OXIDES FOR LITHIUM ION BATTERIES

(71) Applicant: BASF SE, Ludwigshafen (DE)

(72) Inventors: Christoph Erk, Ludwigshafen (DE); Thomas Michael Ryll, Eppelheim (DE); Jordan Lampert, Cleveland, OH (US)

(73) Assignee: BASF SE, Ludwigshafen (DE)

( * ) Notice: Subject to any disclaimer, the term of this patent is extended or adjusted under 35 U.S.C. 154(b) by 281 days.

(21) Appl. No.: 15/524,898

(22) PCT Filed: Oct. 30, 2015

(86) PCT No.: PCT/EP2015/075222
§ 371 (c)(1),
(2) Date: May 5, 2017

(87) PCT Pub. No.: WO2016/071219
PCT Pub. Date: May 12, 2016

(65) Prior Publication Data
US 2017/0355614 A1    Dec. 14, 2017

Related U.S. Application Data

(60) Provisional application No. 62/076,545, filed on Nov. 7, 2014.

(51) Int. Cl.
*H01M 4/02*    (2006.01)
*C01G 53/00*    (2006.01)
(Continued)

(52) U.S. Cl.
CPC .......... *C01G 53/006* (2013.01); *C01G 53/44* (2013.01); *H01M 4/485* (2013.01); *H01M 4/505* (2013.01); *H01M 4/525* (2013.01); *C01P 2004/03* (2013.01); *C01P 2004/61* (2013.01); *H01M 10/0525* (2013.01)

(58) Field of Classification Search
CPC ..................................................... H01M 4/02
See application file for complete search history.

(56) References Cited

U.S. PATENT DOCUMENTS

2006/0105239 A1    5/2006    Paulsen et al.
2009/0068561 A1    3/2009    Sun et al.
(Continued)

FOREIGN PATENT DOCUMENTS

WO    WO 2004/040677 A1    5/2004
WO    WO 2007/114557 A1    10/2007
(Continued)

OTHER PUBLICATIONS

Koenig et al. (Chem. Mater. 2011, 23, 7, 1954-1963).*
(Continued)

*Primary Examiner* — Jacob B Marks
(74) *Attorney, Agent, or Firm* — Oblon, McClelland, Maier & Neustadt, L.L.P.

(57) ABSTRACT

A process is described for producing mixed oxide in particulate form, comprising cations of lithium and cations of at least two transition metals selected from the group consisting of nickel, cobalt, manganese, titanium, vanadium, chromium and iron, as are mixed oxides produced by this process.

18 Claims, 1 Drawing Sheet

(51) Int. Cl.
*H01M 4/485* (2010.01)
*H01M 4/505* (2010.01)
*H01M 4/525* (2010.01)
*H01M 10/0525* (2010.01)

(56) References Cited

U.S. PATENT DOCUMENTS

| | | | |
|---|---|---|---|
| 2009/0309063 A1 | 12/2009 | Paulsen et al. | |
| 2012/0270107 A1* | 10/2012 | Toya | C01G 53/006 429/223 |
| 2014/0158932 A1 | 6/2014 | Sun et al. | |
| 2014/0308584 A1* | 10/2014 | Endo | H01M 4/505 429/223 |

FOREIGN PATENT DOCUMENTS

| | | |
|---|---|---|
| WO | WO 2008/092568 A1 | 8/2008 |
| WO | WO 2014/180743 A1 | 11/2014 |

OTHER PUBLICATIONS

U.S. Appl. No. 14/889,577, filed Nov. 6, 2015, US 2016-0126548 A1, Simon Schroedle.
U.S. Appl. No. 14/889,663, filed Nov. 6, 2015, US 2016-0118662 A1, Simon Schroedle.
U.S. Appl. No. 14/889,602, filed Nov. 6, 2015, US 2016-0093881 A1, Simon Schroedle.
International Preliminary Report on Patentability dated May 18, 2017 in PCT/EP2015/075222.
International Search Report and Written Opinion dated Jan. 25, 2016 in PCT/EP2015/075222.
Jess, et al., "Herstellung von Kohlenstoff-Nanotubes und -Fasern Durch Gasphasenabscheidung", Chemie Ingenieur Technik, vol. 78, Issue 1-2, Feb. 2006, pp. 94-100.
Lee, et al., "Synthetic Optimization of Li[Ni$_{1/3}$Co$_{1/3}$Mn$_{1/3}$]O$_2$ via Co-Precipitation", Electrochimica Acta, vol. 50, Issue 4, Dec. 15, 2004, pp. 939-948.
Noh, et al., "Comparison of Nanorod-Structured Li[Ni$_{0.54}$Co$_{0.16}$Mn$_{0.30}$]O$_2$ with Conventional Cathode Materials for Li-Ion Batteries", ChemSusChem, vol. 7, Issue 1, Jan. 2014, pp. 245-252.
Noh, et al., "Cathode Material with Nanorod Structure—An Application for Advanced High-Energy and Safe Lithium Batteries", Chemistry of Materials, vol. 25, Issue 10, 2013, pp. 2109-2115.
Sun et al. "A Novel Concentration-Gradient Li[Ni$_{0.83}$Co$_{0.07}$Mn$_{0.10}$]O$_2$ Cathode Material for High-Energy Lithium-ion Batteries", Journal of Materials Chemistry, vol. 21, Issue 27, 2011, pp. 10108-10112.
Sun, et al., "Nanostructured High-Energy Cathode Materials for Advanced Lithium Batteries", Nature Materials, vol. 11, Issue 11, Nov. 2012, pp. 942-947.

* cited by examiner

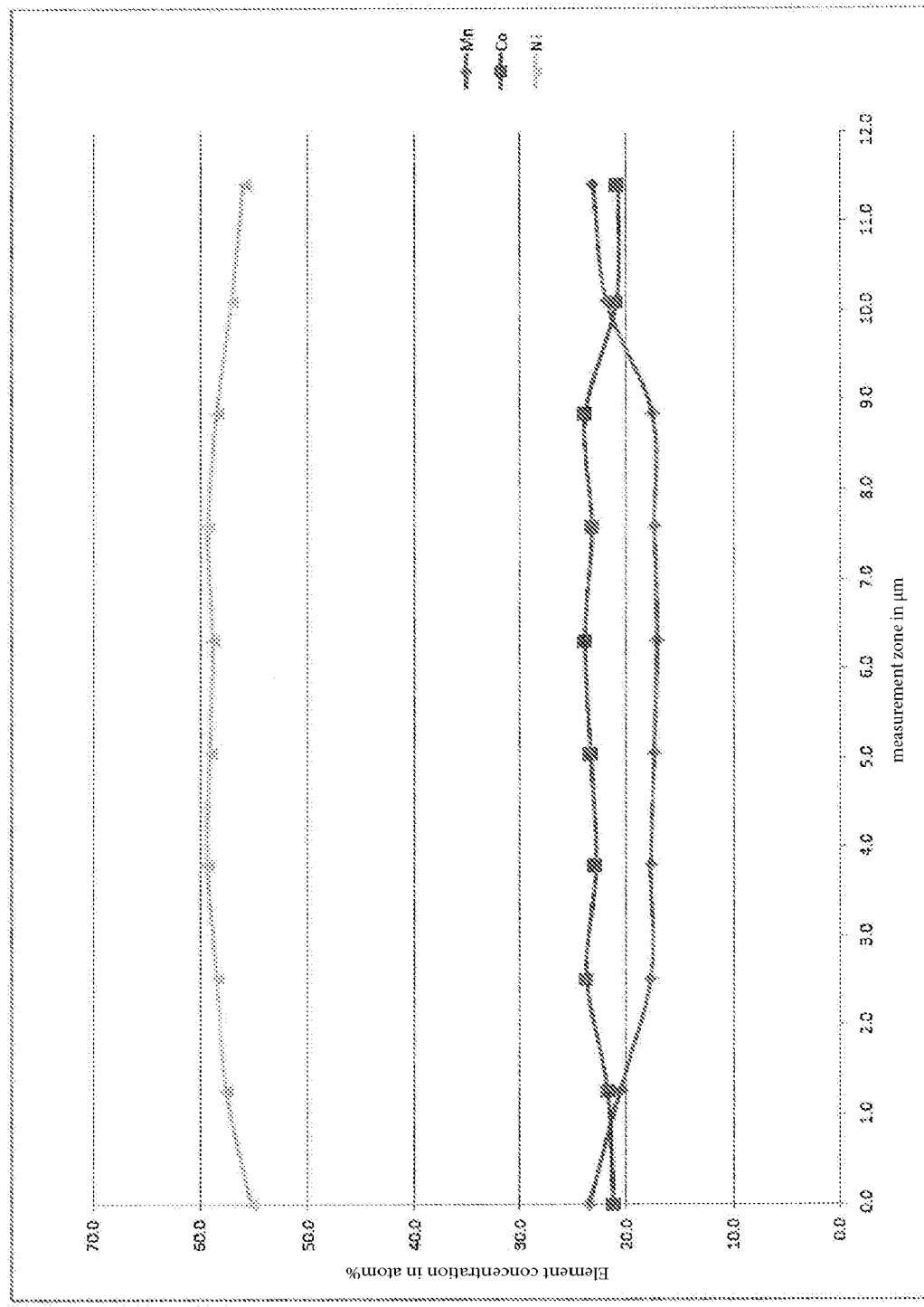

MIXED TRANSITION METAL OXIDES FOR LITHIUM ION BATTERIES

The present invention relates to a process for producing mixed oxide in particulate form, comprising cations of lithium and cations of at least two transition metals selected from the group consisting of nickel, cobalt, manganese, titanium, vanadium, chromium and iron (also called mixed lithium-transition metal oxide hereinafter), and also to mixed oxides produced by this process and to the use thereof for production of cathodes for lithium ion batteries or as active material for cathodes of lithium ion batteries.

Electrochemical cells, for example batteries or accumulators, serve to store electrical energy. Recently, what are called lithium ion batteries have been the subject of particular interest. They are superior to the conventional batteries in several technical aspects. For instance, they can be used to generate voltages unobtainable with batteries based on aqueous electrolytes.

In lithium ion batteries, an important role is played by the materials from which the electrodes are formed, and especially by the electrochemically active material of the cathode. In many cases, the electrochemically active materials (also called "active materials") used are lithium-containing mixed transition metal oxides, especially lithium-containing mixed nickel-cobalt-manganese oxides.

Lithium ion batteries are in need of improvement with regard to cycling stability, especially at elevated temperature, for example at 35° C. to 60° C., and with regard to lifetime and safety, especially with respect to short-circuits, in the event of mechanical damage to the battery or in the event of excessive thermal stress. A further problem is the evolution of gas, which can lead to rapid failure of the battery especially in the case of nickel-rich cathode materials. A further problem, for which there is no conclusive solution as yet, is that of current durability (rate capability).

There have been proposals to solve such problems by using what are called gradient materials or core-shell materials as active materials. For instance, Y.-K. Sun et al. in *J. Mater. Sci.* 2011, 21, 10108 propose materials having a very high nickel content, the particles having a nickel content of 83 mol % and the core having a nickel content of 90 mol %.

The problem addressed is therefore that of providing a process for producing active materials for cathodes of lithium ion batteries which allow improved rate capability and cycling stability, especially at relatively high operating temperatures (35° C. to 60° C.), but without having to accept downsides in terms of specific capacity and hence energy density. A further problem addressed was that of providing a process for producing cathode materials for lithium ion batteries which have improved rate capability and cycling stability, especially at relatively high operating temperatures (35 to 60° C.), without having to accept downsides in terms of energy density.

This problem is solved by the process of the invention as described below. The process of the invention for producing mixed oxide in particulate form, comprising cations of lithium and cations of at least two transition metals selected from the group consisting of nickel, cobalt, manganese, titanium, vanadium, chromium and iron, comprises the steps of producing or providing spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, where the concentration of at least one of the transition metal cations in the spherical particles, plotted in each case over a radius of the particle in question, has at least one relative extreme value which is neither in the center or at the edge of the particle in question, producing a mixture by mixing the spherical particles produced or provided and at least one lithium compound selected from the group consisting of $Li_2O$, $LiOH$, $LiNO_3$, $Li_2SO_4$, $LiCl$ or $Li_2CO_3$, optionally subjecting the mixture produced to further treatment, subjecting the mixture which has been produced and has optionally been subjected to further treatment to treatment at a temperature in the range from 800° C. to 950° C., so as to form a mixed oxide in particulate form comprising cations of lithium and cations of at least two transition metals selected from the group consisting of nickel, cobalt, manganese, titanium, vanadium, chromium and iron, where, in the particles of the mixed oxide, the concentration of the cations of at least one of the transition metals, plotted in each case over a radius of the particle in question, has a concentration gradient within a region from a point between 0% and 80% of the radius of the particle in question as far as a point between 80% and 100% of the radius of the particle in question, where these two points relative to one another are separated by at least 5% of the radius of the particle in question, and the concentration of lithium cations, plotted in each case over a radius of the particle in question, is essentially constant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows, for an illustrative mixed oxide particle, the concentration of the transition metals nickel, manganese and cobalt plotted over the measurement zone (cross section of the particle).

It has been found that both the precursor of the mixed lithium-transition metal oxide for use as active material and the process regime in the reaction of this precursor with a lithium compound which serves as lithium ion source have a crucial influence on the properties of the mixed lithium-transition metal oxide.

According to the invention, the precursor used for the production of mixed lithium-transition metal oxides is spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, where the concentration of at least one of the transition metal cations in the spherical particles, plotted in each case over a radius of the particle in question, has at least one relative extreme value which is neither in the center or at the edge of the particle in question. Particles of this kind are described in European patent application number EP 13 167 005.1 (published as WO 2014/180743), which was yet to be published at the priority date of the present application.

There follows a specific description of the precursor for use for production of mixed lithium-transition metal oxides by the process of the invention:

The precursor used for the process of the invention is spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, where the concentration of at least one of the transition metal cations in the spherical particles, plotted in each case over a radius of the particle in question, has at least one relative extreme value which is neither in the center or at the edge of the particle in question.

The concentration of the transition metal cations as a function of the particle radius can be determined by SEM-EDX (Scanning Electron Microscopy with Energy-Dispersive X-ray spectroscopy).

The term "transition metal carbonates" also comprises basic transition metal carbonates in which more than 50 mol % of the anions are carbonate ions, and the term "transition metal hydroxides" also comprises transition metal oxy hydroxides wherein more than 50 mol % of the anions are hydroxide ions.

The particles of the precursor for use in accordance with the invention have an essentially spherical shape. The term "spherical" encompasses both particles which are exactly spherical and those particles for which the maximum and minimum diameters of at least 95% (number average) of a representative sample differ by up to a maximum of 25%, preferably by up to a maximum of 15%. In a specific embodiment, the particles of the precursor for use in accordance with the invention are exactly spherical.

In the case of particles that are not ideal spheres, radius is understood to mean any straight line connecting a point on the outer edge of the particle and the center of gravity of the volume of the particle in question.

Preferably, the particles of the precursor for use in accordance with the invention have a median diameter (D50) in the range from 0.1 to 35 µm, preferably 1 to 30 µm, more preferably 2 to 20 µm, for example measured by light scattering. Suitable instruments for determining the median particle diameter by means of light scattering are commercially available, for example the Malvern Mastersizer.

In a preferred embodiment of the present invention, the spherical particles of the precursor for use in accordance with the invention have a narrow particle diameter distribution. Thus, it is preferable that the following inequations are satisfied: (D10)≥0.5·(D50) and (D90)≤1.7·(D50).

Particles of the precursor for use in accordance with the invention may be present in the form of agglomerates of primary particles. Corresponding primary particles have, for example, a mean diameter in the range from 50 nm to 500 nm.

In one embodiment, in transition metal carbonates for use as precursor for the process of the invention, at least 99.5 mol %, preferably at least 99.9 mol %, of the anions are carbonate ions, based on all the anions in the particles of the precursor for use in accordance with the invention.

In one embodiment, in transition metal hydroxides for use as precursor for the process of the invention, at least 99.5 mol %, preferably at least 99.9 mol %, of the anions are hydroxide ions, based on all the anions in the particles of the precursor for use in accordance with the invention.

In one embodiment, in transition metal carbonate hydroxides for use as precursor for the process of the invention, at least 99.5 mol %, preferably at least 99.9 mol %, of the anions are carbonate ions and hydroxide ions, based on all the anions in the particles of the precursor for use in accordance with the invention. The carbonate ions and hydroxide ions are present, for example, in a molar ratio of 1:10 to 10:1.

Further anions, preferably not more than 0.5 mol %, more preferably not more than 0.1 mol %, based on all the anions in the particles of the precursor for use in accordance with the invention, are, for example, oxide ions or counterions of salts which are used as starting material for production of the precursor for use in accordance with the invention, for example sulfate ions, halide ions, nitrate ions or carboxylate ions, for example acetate.

In one embodiment, particles of the precursor for use in accordance with the invention comprise cations of at least two transition metals selected from the group consisting of nickel, cobalt, manganese, titanium, vanadium, chromium and iron, preferably the cations of at least three of the aforementioned transition metals.

In one embodiment, particles of the precursor for use in accordance with the invention comprise predominantly, for example to an extent of at least 90 mol % (based on all the transition metal cations in the particles), the cations of at least two transition metals selected from the group consisting of nickel, cobalt, manganese, titanium, vanadium, chromium and iron, preferably to an extent of at least 95 mol %, preferably the cations of at least three of the aforementioned transition metals.

In one embodiment, the particles of the precursor for use in accordance with the invention comprise cations of manganese, cobalt and nickel and optionally of at least one further transition metal.

In one embodiment, the particles of the precursor for use in accordance with the invention comprise predominantly, for example to an extent of at least 90 mol %, based on all the transition metal cations, cations of manganese, cobalt and nickel and optionally of at least one further transition metal.

Preferably, the particles of the precursor for use in accordance with the invention comprise unmeasurable or only very small proportions of lithium, for example not more than in the range from 0.0001 to 0.001% by weight, based on transition metal cations.

In one embodiment, the concentration of nickel in the particles of the precursor for use in accordance with the invention, plotted in each case over a radius of the particle in question, is in the range from 40 to 80 mol %, based on the total concentration of transition metal cations in the particle in question. This means that the concentration of nickel ions everywhere in the particle in question is 40 mol % or higher and 80 mol % or less.

It is a characteristic feature of particles of the precursor for use in accordance with the invention that the concentration of at least one of the transition metal cations in these particles, plotted in each case over the radius of the particle in question, has at least one relative extreme value which is neither in the center nor at the edge of the particle in question. For example, the concentration of cations from the group consisting of nickel cations and manganese cations has a relative extreme value which is neither in the center nor at the edge of the particle in question. Concentration differences in the region of ±1 mol % or less, based on relative maximum and relative minimum, are not regarded as extreme values.

Preferably, the concentrations of the cations of at least two different transition metals, plotted in each case over the radius of the particle in question, each have at least one extreme value which is neither in the center nor at the edge of the particle in question, the extreme values preferably being complementary to one another: for example, the concentration of one transition metal has a relative maximum and the concentration of a second transition metal a relative minimum.

In this case, the concentration of the cations in question need not vary over the entire radius of the particle in question, but may instead, in one embodiment, vary over part of the radius, for example in half of the radius, especially in the outer half of the radius, the concentrations of the cations in question being essentially constant over the other half of the radius. In a preferred embodiment, in those particles of the precursor for use in accordance with the invention having a median diameter in the range from 6 to 30 µm, preferably to 15 µm, the concentration of the respective transition metal cations is essentially constant in a core, for example a core having a diameter of up to 40% of the particle diameter, and varies outside the core, as described above.

It is preferable when the the concentration of the cations of at least one of the transition metals, plotted in each case over a radius of the particle in question, has at least one turning point. It is especially preferable when the concentrations of at least two different transition metal cations, plotted over the radius of the particle in question, each have at least one turning point, the turning points preferably being complementary to one another.

It is very especially preferable when the concentrations of at least two transition metal cations, plotted in each case over a radius of the particle in question, have a plurality of relative extremes and a corresponding number of turning points, for example the concentrations of nickel cations and manganese cations.

In one embodiment, in the particles of the precursor for use in accordance with the invention, the concentration of cations of a transition metal selected from the group consisting of cobalt and manganese, plotted in each case over a radius of the particle in question, is essentially constant. The meaning of "essentially constant" here is that:

plotted over the radius of the particle in question, the fluctuation in the concentration is not greater than the measurement error in the determination of concentration.

In one embodiment of the precursor for use in accordance with the invention, the concentration of the cations of one or preferably two of the transition metals has extreme values and optionally turning points, but the concentration of a third transition metal is essentially constant. In a very especially preferred embodiment of the precursor for use in accordance with the invention, the concentrations of nickel and manganese have relative extreme values, and the concentration of cobalt remains essentially constant.

In one embodiment, within the particle in question of the precursor for use in accordance with the invention, the concentration of the cations of at least one of the transition metals varies in the manner of a constant function or in steps of not more than 10 mol %, preferably in the manner of a constant function or in steps of not more than 5 mol %, for example in steps of 2 to 7 mol %.

In one embodiment, within the particle in question of the precursor for use in accordance with the invention, the concentration of the cations of at least one of the transition metals differs between two relative extreme values by at least 6 mol %, preferably by at least 10 mol %.

When the concentration of transition metal cations varies in steps of not more than 10 mol % or preferably in steps of 2 to 7 mol %, layers having constant composition may form in particles of the precursor for use in accordance with the invention. Layers of this kind have, for example, a thickness in the range from 0.2 to 5 µm, and particles having a diameter of at least 10 µm, for example, have individual layers having a maximum thickness of 0.5 µm.

In one embodiment of the present invention, particles of the precursor for use in accordance with the invention have an average composition corresponding to the following formula (I):

$$Ni_aCo_bMn_cM_dO_e(OH)_f \qquad (I)$$

in which the variables are defined as follows:
M is Mg or Al and/or one or more transition metals selected from Fe, Cr and V,
a is in the range from 0.4 to 0.8, preferably 0.48 to 0.65,
b is in the range from 0.1 to 0.4, preferably 0.15 to 0.25,
c is in the range from 0.1 to 0.5, preferably 0.15 to 0.35,
d is in the range from zero to 0.2, preferably zero to 0.02,
where: a+b+c+d=1,
e is in the range from zero to 1, preferably 0.5 to 0.8,
f is in the range from 0.5 to 2, preferably 1.1 to 1.6,
where the mean oxidation state of Ni, Co and Mn is in the range from 2.1 to 3.2. The mean oxidation state of Ni, Co and Mn is understood to mean the oxidation state averaged over all the transition metals in the particle in question.

In another embodiment of the present invention, particles of the precursor for use in accordance with the invention have an average composition corresponding to the following formula (Ia):

$$Ni_{a'}Co_{b'}Mn_{c'}M_{d'}O_{e'}(OH)_{f'} \qquad (Ia)$$

in which the variables are defined as follows:
M is Mg and/or one or more transition metals selected from Fe, Cr and V,
a' is in the range from 0.1 to 0.4, preferably 0.18 to 0.35,
b' is in the range from zero to 0.3, preferably 0.1 to 0.3,
c' is in the range from 0.4 to 0.75, preferably 0.48 to 0.67,
d' is in the range from zero to 0.2, preferably zero to 0.05,
where: a'+b'+c'+d'=1,
e' is in the range from zero to 1.2, preferably 0.1 to 0.6,
f' is in the range from 0.5 to 2, preferably 1.0 to 1.9,
where the mean oxidation state (as defined above) of Ni, Co and Mn is in the range from 2.1 to 3.2.

In one embodiment of the present invention, particles of the precursor for use in accordance with the invention have an average composition corresponding to the following formula (II):

$$Ni_{a'}Co_{b'}Mn_{c'}M_{d'}O_{e'}(OH)_j(CO_3)_h \qquad (II)$$

in which the variables are defined as follows:
M is Mg and/or one or more transition metals selected from Fe, Cr and V,
a' is in the range from 0.1 to 0.4, preferably 0.18 to 0.35,
b' is in the range from zero to 0.3, preferably 0.1 to 0.3,
c' is in the range from 0.4 to 0.75, preferably 0.48 to 0.67,
d' is in the range from zero to 0.2, preferably zero to 0.05,
where: a'+b'+c'+d'=1,
e' is in the range from zero to 0.6, preferably zero to 0.2,
h is in the range from 0.4 to 1, preferably 0.7 to 1,
j is in the range from zero to 0.2, preferably 0.01 to 0.1,
and where the mean oxidation state (as defined above) of Ni, Co and Mn is in the range from 2.1 to 3.2.

The above-described particles of transition metal carbonates, transition metal hydroxides or transition metal carbonate hydroxides are used as the precursor for the inventive production of mixed lithium-transition metal oxides suitable as active materials for cathodes of lithium ion batteries.

The precursor for use in accordance with the invention for production of mixed lithium-transition metal oxides (as described above) is obtainable by a process comprising the following steps:

(A) providing an aqueous solution (A) of at least one compound selected from the group consisting of alkali metal carbonates, alkali metal hydrogencarbonates and alkali metal hydroxides and optionally at least one compound L selected from organic amines and ammonia, (B) providing at least two aqueous solutions (B1) and (B2) of transition metal salts, comprising cations of a total of at least two transition metals selected from the group consisting of nickel, cobalt, manganese, titanium, vanadium, chromium and iron, the aqueous solutions (B1) and (B2) having different molar ratios of the transition metal cations, (C) combining the at least one aqueous solution (A) and optionally the at least one compound L with the at least two aqueous solutions (B1) and (B2) in (C1) a stirred tank cascade comprising at least two stirred tanks or in (C2) a batch reactor, so as to precipitate spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, by (C1) feeding solutions (B1) and (B2) into various stirred tanks in the stirred tank cascade or by (C2) feeding solutions (B1) and (B2) at different times or in different amounts into the batch reactor to bring about successive precipitations at different transition metal concentrations, such that the concentration of at least one of the transition metal cations in the precipitated spherical particles, plotted in each case over the radius of the particle in question, has at least one relative extreme value which is neither in the center nor at the edge of the particle in question, (D) removing the spherical particles thus precipitated.

To produce the solution (A), at least one alkali metal hydroxide, for example potassium hydroxide or preferably sodium hydroxide, or at least one alkali metal (hydrogen)carbonate is dissolved in water. Examples of alkali metal hydroxide, alkali metal carbonate and alkali metal hydrogencarbonate are sodium hydroxide, potassium hydroxide, sodium carbonate, potassium carbonate, sodium hydrogencarbonate and potassium hydrogencarbonate, and mixtures thereof.

In one embodiment, solution (A) has a concentration of alkali metal hydroxide in the range from 1 to 50% by weight, preferably 10 to 25% by weight. In another embodiment, solution (A) has a concentration of alkali metal (hydrogen)carbonate in the range from 1% by weight up to a maximum of a saturated solution, in the case of $NaHCO_3$ up to about 10% by weight, in the case of $Na_2CO_3$ up to 21.5% by weight, in each case at 20° C., or more at correspondingly higher temperature.

In one embodiment, an excess of alkali metal hydroxide or alkali metal (hydrogen)carbonate is used, based on transition metal. The molar excess may, for example, be in the range from 1.1:1 to 100:1. In a preferred embodiment, stoichiometric amounts of alkali metal hydroxide or alkali metal (hydrogen)carbonate are employed, based on transition metal.

In a preferred embodiment, solution (A) comprises at least one compound L selected from the group consisting of ammonia and organic amines which can serve as ligand for at least one of the transition metals. Ammonia is preferably used as compound L. Water should not be regarded as compound L.

In a preferred embodiment, a sufficient amount of ligand L, more preferably a sufficient amount of ammonia, is used that the concentration of ligand L, preferably ammonia, in the mother liquor is in the range from 0.05 to 1 mol/L, preferably 0.1 to 0.7 mol/L. Particular preference is given to ammonia concentrations at which the nickel solubility in the mother liquor is not more than 1000 ppm, more preferably not more than 500 ppm. Ammonia concentration is understood to mean the concentration of ammonia including ammonium. Correspondingly, organic amines are also understood to mean protonated organic amines.

In step (B), at least two different solutions (B1) and (B2) are produced, comprising a total of at least two different transition metals, specifically in the form of water-soluble salts, the aqueous solutions (B1) and (B2) having different molar ratios of the transition metals. "Water-soluble" is understood to mean that the transition metal salt in question dissolves in distilled water at 20° C. to an extent of at least 10 g/L, preferably at least 50 g/L. Examples are the halides, nitrates, acetates and especially the sulfates of nickel, cobalt, manganese, titanium, vanadium, chromium and iron, preferably in the form of the aquo complexes thereof.

In one embodiment, the aqueous solutions (B1) and (B2) comprise cations of at least two different transition metals in each case, preferably of at least three different transition metals.

For the aqueous solutions (B1) and (B2), the concentrations can be chosen within wide ranges. Preference is given to concentrations in the range from a total of 1 to 1.8 mol of transition metal/kg of solution, particular preference to 1.5 to 1.7 mol of transition metal/kg of solution. The aqueous solutions (B1) and (B2) preferably have a pH in the range from 4 to 7. Preferably, neither aqueous solution (B1) nor aqueous solution (B2) comprises ligand L.

In one embodiment, the proportion of at least one of the transition metals in the aqueous solution (B1) differs by at least 5 mol % from the proportion in the aqueous solution (B2). For example, the proportion of $Ni^{2+}$ in aqueous solution (B1) may be at least 5 mol % higher than in (B2). For example, the proportion of $Mn^{2+}$ in aqueous solution (B1) may be at least 5 mol % lower than in (B2). In this context, the proportions are based on total transition metal in the aqueous solution.

In step (C), the at least one aqueous solution (A) and optionally the at least one compound L are combined with the at least two aqueous solutions (B1) and (B2) in (C1) a stirred tank cascade comprising at least two stirred tanks or in (C2) a batch reactor, so as to precipitate spherical particles of at least one compound selected from the group consisting of transition metal carbonates, transition metal hydroxides and transition metal carbonate hydroxides, each containing cations of at least two transition metals selected from the group consisting of nickel, cobalt, manganese, titanium, vanadium, chromium and iron, by (C1) feeding aqueous solution (B1) and (B2) into various stirred tanks in the stirred tank cascade or by (C2) feeding solutions (B1) and (B2) at different times or in different amounts into the batch reactor to bring about successive precipitations at different transition metal concentrations, such that the concentration of at least one of the transition metal cations in the precipitated spherical particles, plotted in each case over the radius of the particle in question, has at least one relative extreme value which is neither in the center nor at the edge of the particle in question.

In step (C), precipitations are brought about at different transition metal concentrations. This is understood to mean that different concentrations of transition metal cations and different ratios of the concentrations of the transition metal cations used are present in the liquid phase over time—variant (C2)—or locally—variant (C1). The ratio of the concentrations of the transition metal cations used which exists at the particular site in the stirred tank cascade or at the particular time in the precipitation in the batch reactor then determines the composition of the different layers or points in the particles of the precursor for use in accordance with the invention that form.

During step (C), solution (A) is metered in, without or with ligand L. In one variant, solution (A) and, separately, ligand L are metered in during step (C), or two solutions (A), one of which additionally comprises ligand L and the other does not, are metered in.

Preferably, step (C) is conducted at molar ratios of at least two of the transition metal cations (for example $Ni^{2+}$, $Mn^{2+}$ and optionally $Co^{2+}$) that vary during the precipitation, with the concentration of at least one of the transition metal cations, for example $Ni^{2+}$ or $Mn^{2+}$ or optionally $Co^{2+}$, passing through at least one local minimum or one local maximum during the precipitation or preferably additionally at least one turning point during the precipitation. This can be achieved, in the case of performance of step (C) in a batch reactor, by metering in different solutions aqueous solutions (B1) and (B2) over the course of the precipitation, or, in the case of performance of step (C) in a stirred tank cascade, by metering different aqueous solutions (B1) and (B2) into the different stirred tanks, the solutions (B1) and (B2) each comprising the appropriate transition metal cations.

More preferably, in step (C), the molar ratios of $Ni^{2+}$, $Mn^{2+}$ and optionally $Co^{2+}$ vary during the precipitation, with the concentration of at least one of the transition metals, for example $Co^{2+}$ or preferably $Ni^{2+}$ and/or $Mn^{2+}$, passing through at least one local minimum or one local maximum during the precipitation or preferably additionally at least one turning point during the precipitation. This can be achieved, in the case of performance of step (C) in a batch reactor, by metering in different solutions aqueous solutions (B1) and (B2) over the course of the precipitation, or, in the case of performance of step (C) in a stirred tank cascade, by metering different aqueous solutions (B1) and (B2) into the different stirred tanks, the solutions (B1) and (B2) each comprising nickel salt, manganese salt and optionally cobalt salt.

Preferably, a stirred vessel is initially charged with an aqueous solution comprising ligand L, and, in one phase of step (C), a solution (B1) comprising nickel salt, manganese salt and optionally cobalt salt is metered in, and simultaneously solution (A) as defined above.

The metered addition is controlled such that the pH of the mother liquor is in the range from 10.5 to 11.3. Then a solution (B2) comprising nickel salt, manganese salt and optionally cobalt salt in a different molar composition is metered in, and simultaneously a further solution (A).

More preferably, a stirred vessel is initially charged with an aqueous solution comprising ligand L, and, in one phase of step (C), a solution (B1) comprising nickel salt, manganese salt and optionally cobalt salt is metered in, and simultaneously solution (A). The metered addition is controlled such that the pH of the mother liquor is in the range from 10.5 to 11.3. Then an aqueous solution (B1) and additionally aqueous solution (B2) comprising nickel salt, manganese salt and optionally cobalt salt in a different molar composition than (B1) is metered in, and simultaneously a further solution (A) comprising at least one alkali metal hydroxide or at least one alkali metal carbonate or at least one alkali metal hydrogencarbonate. The metered addition of aqueous solution (B2) may commence gradually or abruptly. The metered addition of aqueous solution (B2) can be effected simultaneously with the metered addition of aqueous solution (B1), or without simultaneous metered addition of aqueous solution (B1).

In the case of use of a batch reactor, it is possible to alter the concentration ratios of the transition metal cations not just once but several times over the course of the precipitation. For example, only aqueous solution (B1) is metered in at first, then aqueous solution (B2) and optionally aqueous solution (B1), then exclusively aqueous solution (B1) again, then aqueous solution (B2) and optionally aqueous solution (B1), for example in a single alternation or up to 20 alternations.

In another variant, the concentration ratios of the transition metal cations are altered several times, by first metering in aqueous solution (B1) and aqueous solution (B2) in a first ratio, then in another ratio, then back in the first ratio again, then back in the other ratio again, for example in a single alternation or up to 20 alternations.

In a preferred embodiment, aqueous solution (B1) and (B2) are metered in simultaneously at least intermittently, in which case the two solutions are mixed before they enter the reactor, for example in a static mixer.

In one embodiment, water is introduced into the stirred vessel continuously or intermittently, for example in an amount of up to 300% by volume of the sum total of all the aqueous solutions (A), (B1) and (B2), preferably up to 50% by volume.

In one embodiment, step (C) is conducted at temperatures in the range from 10° C. to 85° C., preferably at temperatures in the range from 20° C. to 50° C.

In one embodiment, step (C) is effected at a pH in the range from 7.5 to 12.5, preferably 11.3 to 12.0. In this case, the pH in the course of performance of step (C) may be essentially constant or increase by up to 0.2 unit or decrease by up to 1.0 unit or vary by up to 0.2 unit. However, the pH does not go below the lower limit of 7.5 or go above the upper limit of 12.5 in the course of precipitation of hydroxides. For precipitation of carbonates, it is preferable to work within a pH range from 7.5 to 8.5, measured in each case at 23° C. in the mother liquor.

In one embodiment, step (C) is conducted at a pressure in the range from 500 mbar to 20 bar, preference being given to standard pressure.

During the performance of step (C), the feed rate of aqueous solution (B1) or (B2) is constant in each case or varies within certain limits.

Step (C) is performed under air, under inert gas atmosphere, for example under noble gas or nitrogen atmosphere, or under reducing atmosphere. Examples of reducing gases include, for example, CO and $SO_2$. Preference is given to working under inert gas atmosphere.

During the performance of step (C), it is possible to draw off mother liquor from the stirred tank cascade or the batch reactor without withdrawing particles that have already precipitated. Mother liquor refers to the totality of water, water-soluble salts and any further additives present in solution. Water-soluble salts present are, for example, alkali metal salts of the counterions of transition metal cations, for example sodium acetate, potassium acetate, sodium sulfate, potassium sulfate, sodium nitrate, potassium nitrate, sodium halide, especially sodium chloride, potassium halide. In addition, the mother liquor comprises, for example, additional salts, any additives used, and any excess alkali metal carbonate or alkali metal hydroxide, and also ligand L. In addition, the mother liquor may comprise traces of soluble transition metal salts. Examples of suitable apparatuses for drawing off mother liquor without withdrawing precipitated particles are sedimenters, inclined clarifiers, centrifuges, filters and clarifying apparatus, and also separation apparatus which exploits the difference in density between mother liquor and particles.

In one embodiment, it is possible by means of an inclined clarifier divided into two sections to draw off mother liquor by also removing gas bubbles introduced into the suspension by the stirring in the stirred vessel as well as precipitated particles.

In one embodiment, aqueous solution (B1) or (B2) is produced in a vessel connected to the batch reactor and then metered into the batch reactor. For this purpose, for example, aqueous solution (B1) having a certain molar ratio of the transition metals is first produced in the vessel connected to the batch reactor and metered into the batch reactor. Once a certain proportion of aqueous solution (B1) has been metered in, transition metal salts are added in a different molar ratio of the transition metals in the vessel connected to the batch reactor, and aqueous solution (B2) is produced in this way. Then aqueous solution (B2) is metered into the batch reactor. In this embodiment, the aqueous solution (B2) preferably does not have a constant composition.

In one embodiment, a third aqueous solution (B3) is provided, comprising transition metal cations in a molar ratio which differs from the molar ratio of the transition metal cations of aqueous solution (B1) and (B2), and is metered into a third stirred tank in a cascade or into the batch reactor at another time.

In one embodiment, the concentration of L and the pH are chosen such that the concentration of soluble $Ni^{2+}$ salts in the mother liquor is below 1000 ppm and the concentration of soluble $Co^{2+}$ salts and $Mn^{2+}$ salts is below 200 ppm in each case, the concentration of soluble $Ni^{2+}$ salts in the mother liquor preferably being below 400 ppm and the concentrations of soluble $Co^{2+}$ salts and $Mn^{2+}$ salts preferably each being below 50 ppm. The lower limit for the sum total of soluble $Ni^{2+}$ salts, $Co^{2+}$ salts and $Mn^{2+}$ salts is 5 ppm.

The concentration of L remains constant or varies during the performance of step (C), preference being given to the latter. More preferably, the concentration of L is lowered during step (C), for example by adding less ligand L than is drawn off with mother liquor.

In one embodiment, by stirring, the power of more than 2 W/L, preferably more than 4 W/L, is introduced into the suspension which arises. In one variant, the power introduced is altered during the reaction time; for example, it is possible to vary the power introduced by stirring. In a specific variant, the procedure is to work at higher mean stirrer input during the first third of the reaction time, for example at 8 W/L, than in the following two thirds, for example at 4 W/L, 5.5 W/L or 6.3 W/L therein. In a preferred embodiment, a mean stirrer output of not more than 20 W/L is introduced.

In one embodiment, step (C) is conducted in a batch reactor over a period of 30 minutes up to 48 hours.

When working with a stirred tank cascade, the duration of step (C) is theoretically unlimited, and the mean residence time may be in the range from 30 minutes up to 48 hours.

In step (D), the particles of the precursor for use in accordance with the invention which have been produced are separated from the mother liquor. The separation is effected, for example, by filtration, centrifugation, decantation, spray-drying or sedimentation, or by a combination of two or more of the aforementioned operations. Suitable apparatuses are, for example, filter presses, belt filters, spray driers, hydrocyclones, inclined clarifiers or combinations of the aforementioned apparatuses.

The separation can be improved, for example, by washing with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. In another variant, the washing is conducted at room temperature. The efficiency of the washing can be checked by analytical measures, for example by analysis of the content of transition metal(s) in the wash water or the wash solution. In one variant, the electrical conductivity of the wash water or the wash solution can be measured. When washing with water rather than with an aqueous solution of alkali metal hydroxide, it is possible to check, with the aid of conductivity studies on the wash water, whether it is still possible to wash out water-soluble substances, for example water-soluble salts.

After the particles of the precursor for use in accordance with the invention have been separated off, they are preferably dried. The drying is effected, for example, with inert gas or with air. The drying is effected, for example, at a temperature in the range from 30° C. to 150° C. In the case of drying with air, an observation made in many cases is that some transition metals are partially oxidized, for example $Mn^{2+}$ to $Mn^{4+}$ and $Co^{3+}$ to $Co^{3+}$, and blackening of the particles of the precursor for use in accordance with the invention is observed. It is preferable to dry with air.

For further information and details in relation to the precursor for use in accordance with the invention, reference is made to patent application number EP 13 167 005.1 (published as WO 2014/180743), which was yet to be published at the priority date of the present application, and the content of which forms part of the present application by way of reference.

After the production or provision of the spherical particles for use as precursor in accordance with the invention (as defined above), a mixture is produced by mixing the spherical particles produced or provided and at least one lithium compound.

The lithium compound is selected from the group consisting of $Li_2O$, $LiOH$, $LiNO_3$, $Li_2SO_4$, $LiCl$ and $Li_2CO_3$, in each case in anhydrous form or, if it exists, as the hydrate. Preference is given to LiOH, for example as the monohydrate, and particular preference to $Li_2CO_3$.

The amounts of inventive particles and lithium compound are chosen so as to obtain the desired stoichiometry of the mixed oxide. Preferably, the inventive particles and lithium compound are chosen such that the molar ratio of lithium to the sum total of all the transition metals in the metal oxide and any M is in the range from 1:1 to 1.3:1, preferably 1.01:1 to 1.1:1.

Optionally, the mixture produced is then subjected to further treatment, for example thermal treatment at one or more temperatures below 800° C., for example in a first stage at a temperature of 300° C. to 400° C. over a period of 4 to 6 hours, and in a further stage at a temperature of 600 to 700° C. over a period of 4 to 6 hours.

A crucial factor for the process of the invention is the treatment (calcination) of the mixture produced, which has optionally been subjected to further treatment, at a temperature in the range from 800° C. to 950° C., so as to form a mixed oxide in particulate form comprising cations of lithium and cations of at least two transition metals selected from the group consisting of nickel, cobalt, manganese, titanium, vanadium, chromium and iron, where, in the particles of the mixed oxide, the concentration of the cations of at least one of the transition metals, plotted in each case over a radius of the particle in question, has a concentration gradient within a region from a point between 0% and 80% of the radius of the particle in question as far as a point between 80% and 100% of the radius of the particle in question, these two points being separated from one another by at least 5% of the radius of the particle in question. For the ranges "between 0% and 80% of the radius" and "between 80% and 100% of the radius", the range thus defined includes the respective starting point and end point.

Preferably, the above-described concentration gradient of the cations of at least one transition metal extends within a range from point between 30% and 70% of the radius of the particle in question as far as a point between 85% and 100% of the radius of the particle in question, more preferably from a point between 40% and 65% of the radius of the particle in question as far as a point between 90% and 100% of the radius of the particle in question. Preferably, the concentration gradient is at least 10%, based on the lowest concentration in the region of the concentration gradient.

It has been found that the inventive selection of temperature and duration of the thermal treatment (calcination) is crucial for the formation of mixed oxide particles having the above-described structure. If the temperature is less than 800° C., the penetration of the mixed oxide particles with lithium cations is insufficient, and lithium cations remain on the surface of the mixed oxide particles. The lithium cations remaining on the surface cause problems in the processibility of the mixed oxide for production of a cathode material for an electrochemical cell. At temperatures greater than 950° C., however, the diffusion of the transition metal cations is too fast, and so the concentration balances out over the total particle radius.

Moreover, it has been found that a calcination temperature in the range from 800° C. to 950° C. brings about an improvement in the crystallinity of the mixed oxide. The thermal treatment of the invention achieves greater homogeneity of the crystal structure of the mixed oxide particles, and dissipates mechanical stresses in the particles.

The electrochemical capacity of mixed lithium-transition metal oxides as a function of the calcination temperature reaches a maximum within the temperature range from 800° C. to 950° C. which is to be employed in accordance with the invention.

If the duration of treatment is too short, the mixed oxide particles formed do not have an essentially constant concentration of lithium cations over the particle radius, but instead have a distinctly decreasing concentration of lithium cations toward the particle center. If the duration of the thermal treatment is too long, the diffusion of the transition metal cations leads to the concentration balancing out over the particle radius, such that the concentration gradients disappear.

The person skilled in the art will be able to find the necessary temperature and duration for the thermal treatment at a temperature in the range from 800° C. to 950° C. by means of test series in which the temperature and duration of the thermal treatment are varied systematically and the structure of the resultant mixed oxide particles is examined. The concentration of the transition metal cations as a function of the particle radius can be determined by SEM-EDX (Scanning Electron Microscopy with Energy-Dispersive X-ray spectroscopy). Suitable methods for analysis of the three-dimensional distribution of lithium in the mixed oxide particles are, for example, electron energy loss spectroscopy (TEM-EELS) or Auger electron spectroscopy (AES).

Particular preference is given to treatment of the mixture produced, which has optionally been subjected to further treatment, at a temperature in the range from 800° C. to 950° C., preferably 850° C. to 925° C., more preferably 890° C. to 900° C., over a period of at least 6.5 to at most 12 hours, preferably at least 6.5 and at most 8 hours. It is generally the case that the higher the temperature, the shorter the treatment time.

Temperatures above 950° C. are not employed during the process of the invention; the temperatures employed during the treatment at a temperature in the range from 800° C. to 950° C. are the highest temperatures to be employed over the course of the process of the invention.

The thermal treatment can be performed in a furnace, for example in a rotary tube furnace, in a muffle furnace, in a pendulum furnace, in a roller hearth furnace or in a push-through furnace. Combinations of two or more of the aforementioned furnaces are also possible.

The thermal treatment is effected at a constant temperature in the range from 800° C. to 950° C. or by means of a temperature profile in the range from 800° C. to 950° C.

The thermal treatment is effected under oxidizing conditions. Preferably, the thermal treatment is effected under an air atmosphere, preferably with a continuous air stream, or, if necessary, under synthetic air ($CO_2$-free) or an oxygen atmosphere.

Mixed oxides produced or producible by the process of the invention are in the form of spherical particles. Spherical particles—as is also the case for the above-described spherical particles for use as precursor in accordance with the invention—shall include not just those which are exactly spherical but also those particles for which the maximum and minimum diameters of at least 95% (number average) of a representative sample differ by up to a maximum of 5%.

In the case of particles that are not ideal spheres, "radius" is understood to mean any straight line connecting a point on the outer edge of the particle and the center of gravity of the volume of the particle in question.

A further aspect of the present invention relates to a mixed oxide producible by the process described above in particulate form, comprising cations of lithium and cations of at least two transition metals selected from the group consisting of nickel, cobalt, manganese, titanium, vanadium, chromium and iron, wherein, in the particles of the mixed oxide, the concentration of the cations of at least one of the transition metals, plotted in each case over a radius of the particle in question, has a concentration gradient within a region from a point between 0% and 80% of the radius of the particle in question as far as a point between 80% and 100% of the radius of the particle in question, where these two points relative to one another are separated by at least 5% of the radius of the particle in question, and the concentration of lithium cations, plotted in each case over a radius of the particle in question, is essentially constant.

For the ranges "between 0% and 80% of the radius" and "between 80% and 100% of the radius", the range thus defined includes the respective starting point and end point.

The meaning of "essentially constant" here is that: plotted over the radius of the particle in question, the fluctuation in the concentration is not greater than the measurement error in the determination of concentration.

Suitable methods for analysis of the three-dimensional distribution of lithium in the mixed oxide particles are, for example, electron energy loss spectroscopy (TEM-EELS) or Auger electron spectroscopy (AES). The concentration of the transition metal cations as a function of the particle radius can be determined by SEM-EDX (Scanning Electron Microscopy with Energy-Dispersive X-ray spectroscopy).

A "concentration gradient" is understood to mean a change (increase or decrease) in the concentration of the cations of a transition metal as a function of the particle radius, this change being greater than the measurement error in the determination of the concentration as a function of the particle radius. The concentration gradient extends over the entire particle radius (i.e. from 0% to 100% of the radius) or over a sub-range of the particle radius (i.e. from >0% to 100% of the radius, or from 0% of the radius to <100% of the radius). The gradient extends only over a sub-range of the particle radius when, outside this sub-range of the particle radius, the concentration of the cations of the transition metal in question, as a function of the particle radius, is either essentially constant or changes only slightly compared to the change in the region of the concentration gradient. The gradient extends here over a range of at least 5% of the particle radius.

Within the range of the particle radius over which the concentration gradient extends (gradient region), the concentration of the transition metal cations in question plotted over the radius does not have any maxima or minima at all. This means that, within the gradient region, the concentration of the transition metal cations in question is between the values that the concentration of the transition metal cations in question has at the starting point and at the end point of the gradient region.

Within the range of the particle radius over which the concentration gradient extends (gradient region), the concentration of the transition metal cations in question plotted over the radius (concentration of the transition metal cations in question as a function of the particle radius) has a constant or a varying slope, the sign of the slope being constant within the gradient region.

Preferably, the above-described concentration gradient of the cations of at least one transition metal extends within a range from point between 30% and 70% of the radius of the particle in question as far as a point between 85% and 100% of the radius of the particle in question, more preferably from a point between 40% and 65% of the radius of the particle in question as far as a point between 90% and 100% of the radius of the particle in question.

Preferably, the concentration gradient is at least 10%, based on the lowest concentration in the region of the concentration gradient.

In one embodiment, in the particles of the mixed oxide produced or producible in accordance with the invention, the concentrations of the cations of two of the transition metals, plotted in each case over a radius of the particle in question, have a concentration gradient within a region from a point between 0% and 80% of the radius of the particle in question as far as a point between 80% and 100% of the radius of the particle in question, where the concentration of the cations of the first transition metal rises in the direction from the center to the edge of the particle in question and the concentration of the cations of the second transition metal falls in the direction from the center to the edge of the particle in question. This means that, in the region of the particle radius over which the two concentration gradients extend, the ratio of the concentration of the cations of the second transition metal to the concentration of the cations of the first transition metal is inversely proportional to the radius. Preferably, the first transition metal is manganese and the second transition metal is nickel.

In one embodiment, the mixed oxide produced or producible in accordance with the invention comprises cations of nickel, manganese and cobalt and optionally at least one further transition metal.

In one embodiment, in the particles of the mixed oxide produced or producible in accordance with the invention, the concentration of nickel, plotted in each case over a radius of the particle in question, is within a range from 40 mol % to 80 mol %, based on the total concentration of transition metals in the particle in question.

In one embodiment, in the particles of the mixed oxide produced or producible in accordance with the invention, the concentration of cations of a transition metal selected from the group consisting of cobalt and manganese, plotted in each case over a radius of the particle in question, is essentially constant. The meaning of "essentially constant" here is that: plotted over the radius of the particle in question, the fluctuation in the concentration is not greater than the measurement error in the determination of concentration.

In one embodiment, particles of mixed oxide produced or producible in accordance with the invention are present in the form of secondary particles (agglomerates) of agglomerated primary particles, where the concentration of the cations of at least one of the transition metals, plotted in each case over a radius of the secondary particle in question, has a concentration gradient within a region from a point between 0% and 80% of the radius of the secondary particle in question as far as a point between 80% and 100% of the radius of the secondary particle in question, where these two points relative to one another are separated by at least 5% of the radius of the particle in question, and the concentration of lithium cations, plotted in each case over a radius of the secondary particle in question, is essentially constant, The primary particles may have, for example, a mean diameter in the range from 10 nm to 500 nm.

In one embodiment, particles of mixed oxide produced or producible in accordance with the invention have a median diameter (D50) in the range from 1 to 30 μm, preferably 5 to 20 μm, measured, for example, by light scattering. Suitable instruments are commercially available, for example Malvern Mastersizer.

In one embodiment, particles of mixed oxide produced or producible in accordance with the invention have a narrow particle diameter distribution. Thus, it is preferable that the following inequations are satisfied: $0.5 \cdot (D10) \geq (D50)$ and $(D90) \leq 1.7 \cdot (D50)$.

In one embodiment, particles of mixed oxide produced or producible in accordance with the invention have a BET surface area of up to 10 m²/g. Preferably, particles of inventive mixed oxide have a BET surface area of at least 0.1 m²/g.

The present invention further provides for the use of mixed oxide produced or producible in accordance with the invention as described above for production of cathodes for lithium ion batteries or as active material for cathodes of lithium ion batteries.

The cathode of a lithium ion battery may, as well as the mixed oxide which acts as active material, comprise carbon in an electrically conductive polymorph, for example in the form of carbon black, graphite, graphene, carbon nanotubes or activated carbon, and also at least one binder, for example a polymeric binder.

The binders are crosslinked or uncrosslinked (co)polymers, the term "co(polymers)" encompassing both homopolymers and copolymers.

Suitable binders are preferably selected from organic (co)polymers and are obtainable, for example, by anionic, catalytic or free-radical (co)polymerization.

Suitable (co)polymers are, for example, polyethylene, polypropylene, polyacrylonitrile, polybutadiene, polystyrene, polyisoprene and polyacrylates, and copolymers of at least two comonomers selected from the group consisting of ethylene, propylene, styrene, (meth)acrylonitrile and 1,3-butadiene. Particular preference is given to polyacrylonitrile.

Polyacrylonitrile is understood in the context of the present invention to mean not only polyacrylonitrile homopolymers but also copolymers of acrylonitrile with 1,3-butadiene or styrene. Preference is given to polyacrylonitrile homopolymers.

In the context of the present invention, polyethylene is understood to mean not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not only homopolymers of styrene but also copolymers with acrylonitrile, 1,3-butadiene, (meth) acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binders are selected from those (co)polymers which have a mean molecular weight $M_w$ in the range from 50 000 to 1 000 000 g/mol, preferably to 500 000 g/mol.

In a particularly preferred embodiment of the present invention, binders are selected from halogenated (co)polymers, especially from fluorinated (co)polymers. Halogenated or fluorinated (co)polymers are understood to mean those (co)polymers comprising, in copolymerized form, at least one (co)monomer having at least one halogen atom or at least one fluorine atom per molecule, preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylenetetrafluoroethylene copolymers, vinylidene fluoride-chlorotrifluoroethylene copolymers and ethylenechlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Suitable electrically conductive carbonaceous materials are, for example, graphite, carbon black, carbon nanotubes, graphene and mixtures of at least two of the aforementioned substances. In one embodiment of the present invention, the electrically conductive carbonaceous material is carbon black, for example selected from lamp black, furnace black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black. In one variant, electrically conductive carbonaceous material is partially oxidized carbon black.

In one embodiment of the present invention, the electrically conductive carbonaceous material is carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

In the context of the present invention, graphene is understood to mean almost ideally or ideally two-dimensional hexagonal carbon crystals of analogous structure to individual graphite layers.

In one embodiment of the present invention, the weight ratio of mixed oxide produced in accordance with the invention and electrically conductive carbonaceous material is in the range from 200:1 to 5:1, preferably 100:1 to 10:1. Mixed oxide produced in accordance with the invention and electrically conductive carbonaceous material have been described above.

In one embodiment, a cathode produced using the mixed oxide produced in accordance with the invention as active material comprises:

in the range from 60 to 98% by weight, preferably 70 to 96% by weight, of mixed oxide produced in accordance with the invention, in the range from 1 to 20% by weight, preferably 2 to 15% by weight, of binder, in the range from 1 to 25% by weight, preferably 2 to 20% by weight, of electrically conductive carbonaceous material.

The geometry of the cathode can be selected within wide limits. It is preferable to configure cathodes as thin films, for example as films having a thickness in the range from 10 µm to 250 µm, preferably 20 µm to 130 µm. In one embodiment, the cathode comprises a foil or film, for example a metal foil, especially an aluminum foil, or a polymer film, for example a polyester film, which may be untreated or siliconized.

Electrochemical cells comprise a counterelectrode (anode), for example a carbon anode, especially a graphite anode, a lithium anode, a silicon anode or a lithium titanate anode.

Electrochemical cells comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_tYLi$ where t is defined as follows:

t=1 when Y is selected from oxygen and sulfur,
t=2 when Y is selected from nitrogen and phosphorus, and
t=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

In one embodiment, electrochemical cells comprise at least one nonaqueous solvent which may be liquid or solid at room temperature, preferably selected from polymers, cyclic or noncyclic ethers, cyclic and noncyclic acetals, and cyclic or noncyclic organic carbonates.

Examples of suitable polymers are especially polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably di-methyl- or -ethyl-end capped polyalkylene glycols.

The molecular weight $M_w$ of suitable polyalkylene glycols and especially of suitable polyethylene glycols is preferably at least 400 g/mol and up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (III) and (IV)

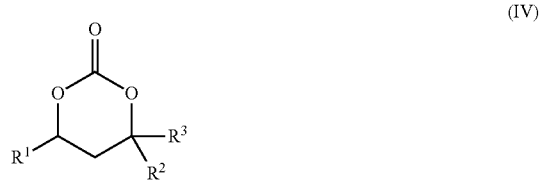

in which $R^1$, $R^2$ and $R^3$ may be the same or different and are each selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl. In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

Preference is given to using the solvent(s) in the anhydrous state, i.e. with a water content in the range from 1 ppm to 0.1% by weight, determinable, for example, by Karl Fischer titration.

In one embodiment, electrochemical cells comprise one or more separators by which the electrodes are mechanically separated from one another. Suitable separators are polymer films, especially porous polymer films, which are unreactive toward metallic lithium. Particularly suitable materials for separators are polyolefins, especially porous polyethylene films and porous polypropylene films. Polyolefin separators, especially of polyethylene or polypropylene, may have a porosity in the range from 35 to 45%. Suitable pore diameters are, for example, in the range from 30 to 500 nm. Likewise suitable are separators made from PET nonwovens filled with inorganic particles. Such separators may have a porosity in the range from 40 to 55%. Suitable pore diameters are, for example, in the range from 80 to 750 nm.

In one embodiment, electrochemical cells further comprise a housing which may be of any shape, for example cuboidal or in the shape of a flat cylinder. In one variant, the housing used is a metal foil elaborated as a pouch.

The electrochemical cells are, for example, batteries or accumulators.

Electrochemical cells having a cathode produced using the mixed oxide produced in accordance with the invention as active material deliver a high voltage and are notable for a high energy density and good stability. More particularly, electrochemical cells of this kind have improved rate capability and cycling stability, especially at relatively high operating temperatures (35° C. to 60° C.), without any downsides in terms of energy density.

Electrochemical cells can be combined with one another, for example in series connection or in parallel connection. Series connection is preferred.

Electrochemical cells of this kind are used to supply power to devices, especially in mobile devices. Examples of mobile devices are vehicles, for example automobiles, bicycles, aircraft, or water vehicles such as boats or ships. Other examples of mobile devices are, for example, computers, especially laptops, telephones or electrical power tools, for example from the construction sector, especially drills, battery-driven screwdrivers or battery-driven tackers.

The use of inventive electrochemical cells offers the advantage of a longer operating time prior to recharging. In order to achieve an equal run time with electrochemical cells having lower energy density, a higher weight for electrochemical cells would have to be accepted.

The invention is now illustrated further by working examples.

General remarks: Liters are understood to mean standard liters, unless stated otherwise.

Percentages in the context of the examples are % by weight, unless explicitly stated otherwise.

The element distribution in the precursors and the mixed oxides produced was determined by SEM-EDX (Scanning Electron Microscopy with Energy-Dispersive X-ray spectroscopy).

I. Inventive Production of a Mixed Oxide

I.1 Production of Spherical Particles of Transition Metal Hydroxides as Precursor Reactor System:

The reactor system has a total volume of 8 L, the reactor system having a stirred tank having a capacity of 7 L and a solid/liquid separation apparatus designed as a combination of inclined clarifier with sedimenter and having a capacity of 1 L. By means of the separation apparatus, liquid phase can be drawn off from the stirred tank via a pump during the reaction, without simultaneously removing solids.

At the start of the process, the reactor system is charged with 8 L of ammonium sulfate solution (concentration 36 g of $(NH_4)_2SO_4$/kg of solution) and heated to 45° C.

The contents of the stirred tank are mixed constantly during the reaction, introducing a mechanical power of about 45 watts into the contents. The specific power input in the stirred tank is thus about 6.4 watts per liter. No stirrer power is introduced in the separation apparatus.

The reactor system is equipped with a pitched blade stirrer and baffles. The electric motor of the stirrer is provided with devices for measurement of speed and torque, in order to determine the stirrer power therefrom. In addition, the reactor system has a plurality of metering units with metering pumps, and also an electrode for pH measurement and a temperature sensor. Additionally provided in the stirred tank is a fill level sensor which regulates the discharge pump at the liquid-side connection of the separation apparatus, such that the liquid level in the stirred tank remained essentially constant. Solids are recycled from the separation apparatus back into the reactor.

The gas space (2 L) in the reactor system is purged with 40 L/h of nitrogen during the performance of the precipitation.

Composition of the aqueous solutions used for the precipitation:

Aqueous solution (A): 5.59 mol of NaOH per kg of solution and 1.55 mol of $NH_3$ (compound L) per kg of solution, prepared from 25% by weight of aqueous NaOH and 25% by weight of aqueous ammonia solution.

Aqueous solution (B1): 1.275 mol per kg of solution of nickel sulfate and 0.375 mol per kg of solution of cobalt sulfate, prepared by dissolving the appropriate hydrate complexes in water.

Aqueous solution (B2): 0.579 mol per kg of solution of nickel sulfate, 0.347 mol per kg of cobalt sulfate and 0.724 mol per kg of solution of manganese sulfate, prepared by dissolving the appropriate hydrate complexes in water.

The pH is regulated using an aqueous solution (C) comprising 6.25 mol of NaOH per kg of solution.

Process Procedure:

The pH of the abovementioned ammonium sulfate solution is set to the value of 11.82 by addition of solution (C) (measured at 23° C.). By means of metering pumps, solutions (B1), (B2) and (A) are metered at constant mass flow rate (780/170/516 g/h) into the turbulent zone close to the stirrer blades of the stirred tank of the reactor system. Solutions (B1) and (B2) were premixed in a static mixer before entering the reactor. By means of a regulating unit, the pH is kept constant at 11.82 by means of addition of solution (C) (measured at 23° C.). A suspension of precipitated particles is formed (molar ratio in the particles: Ni:Co:Mn=70:22:8). After 6 hours, the flow rates of (B1) and (B2) are altered such that, after a further 3 hours, a flow rate of 170 g/h in the case of (B1) and 780 g/h in the case of (B2) is obtained (molar ratio of Ni:Co:Mn=43:21:36). The change in the flow rates is linear, i.e. with a constant change in the flow rates per unit time. Then the flow rates of (B1) and (B2) are left at 170 g/h and 780 g/h respectively for 1 hour. This is followed by further changes in the flow rates:

Linear change to 780 g/h (B1) and 170 g/h (B2) over 3 hours,
Constant flow rates of 780 g/h (B1) and 170 g/h (B2) for 1 hour,
Linear change to 170 g/h (B1) and 780 g/h (B2) over 3 hours,
Constant flow rates of 170 g/h (B1) and 780 g/h (B2) for 3 hours,
Linear change to 780 g/h (B1) and 170 g/h (B2) over 3 hours,
Constant flow rates of 780 g/h (B1) and 170 g/h (B2) for 3 hours,
Linear change to 170 g/h (B1) and 780 g/h (B2) over 3 hours,
Constant flow rates of 170 g/h (B1) and 780 g/h (B2) for 4 hours.

The total run time is 33 hours, then the mixture is stirred without feeds for another 15 min.

A suspension of transition metal hydroxide is obtained, having a molar ratio of Ni:Co:Mn of 57:22:21. The suspension of precipitated transition metal hydroxide obtained as reactor contents (contents of stirred vessel and clarifying apparatus) is filtered through a suction filter, and the filtercake is washed with water and dried at 105° C. over a period of 18 hours. The spherical particles thus obtainable have a net content of 37% by weight of nickel, 14.6% by weight of cobalt and 12.9% by weight of manganese, based in each case on the particles.

In the particles, the transition metals are partly present in a higher oxidation state than in the aqueous solutions (B1) and (B2). The particles are screened (mesh size 32 µm;

coarse material: 0.2%) and the tamped density is determined (2.12 kg/L). A portion was suspended in water and the particle size was determined by light scattering (Malvern Mastersizer 2000). The median particle size D50 is 12.4 µm, with narrow particle diameter distribution (D10=9.1 µm; D90=16.9 µm).

In selected particles, by means of SEM-EDX, the concentration of the transition metals is determined as a function of the radius of the particle in question. Plotted in each case over the radius of the particle in question, the concentration of nickel has two relative maxima in the particles, these being neither at the edge nor in the center, and coinciding in terms of their position as a function of the radius with two relative minima in the concentration of manganese.

I.2 Production of a Mixed Oxide Comprising Cations of Lithium and of Nickel, Cobalt and Manganese The particles obtained as described above are mixed intimately with finely ground lithium carbonate, where the molar ratio of lithium to the sum total of the transition metals present in the particles is 1.03. A portion (40 g) of this mixture was subjected to a thermal treatment in a muffle furnace in an oxygen atmosphere. The thermal treatment comprises several stages at different temperatures, with a constant temperature of 900° C. for 6.5 hours in the last stage. This temperature is the maximum temperature in the entire thermal treatment. About 30 g of inventive active material (AM.1) are obtained. This is screened (mesh size 32 µm; no coarse material). A virtually agglomerate-free powder was obtained with a particle diameter D50 of 14.1 µm, a tamped density of 2.34 kg/L and a residual $Li_2CO_3$ content of 0.23% by weight.

In selected particles of the resultant mixed oxide, by means of SEM-EDX, the concentration of the transition metals is determined as a function of the radius of the particle in question. FIG. 1 shows, for an illustrative mixed oxide particle, the concentration of the transition metals nickel, manganese and cobalt plotted over the measurement zone (cross section of the particle). The concentrations in mol % are based on the total concentration of transition metals in the particle. In the direction from the edge to the center of the particle, the concentration of manganese decreases and the concentration of nickel increases. The concentration of the manganese cations has a concentration gradient in a region from about 50% radius of the particle in question to 100% of the radius of the particle in question (i.e. as far as the edge of the particle), the concentration gradient being about 25%, based on the lowest concentration in the region of the concentration gradient (about 18 mol %). The concentration of the nickel cations has a concentration gradient in a region from about 30% radius of the particle in question to 100% of the radius of the particle in question (i.e. as far as the edge of the particle), the concentration gradient being about 10%, based on the lowest concentration in the region of the concentration gradient (about 55 mol %).

II. Production of Cathodes and Electrochemical Cells
II.1 Production of Cathodes
Materials Used:
Binder (BM.1): polymer of vinylidene fluoride, as solution, 10% by weight in NMP. Powder commercially available as Kynar® HSV900 from Arkema, Inc.
Electrically conductive carbonaceous materials:
Carbon 1: carbon black, BET surface area of about 60 m²/g, commercially available as "Super C65" from Timcal.
Carbon 2: graphite, commercially available as "SFG6L" from Timcal Active material according to example I.2
0.87 g of carbon 1, 1.46 g of carbon 2 and 17.25 g of binder (BM.1) are mixed with addition of 19.5 g of N-methylpyrrolidone (NMP) to give a paste. In a next step, 4.35 g of this paste are mixed with 6.0 g of inventive active material (AM.1). An aluminum foil of thickness 30 µm is coated with the above-described paste, so as to result in an active material loading of about 12 mg/cm². After drying at 105° C., circular pieces of the aluminum foil thus coated (diameter 17.5 mm) were punched out. These serve as cathodes for electrochemical cells.

II.2 Production of Electrochemical Cells

A cathode produced as described above is combined with an anode in the form of a graphite-coated copper foil, the anode being separated from the cathode by a separator made from glass fiber paper. The electrolyte used is a 1 mol/L solution of $LiPF_6$ in ethylene carbonate/diethyl carbonate (1:1 based on parts by mass), which additionally comprises 2% by weight of vinylidene carbonate.

The invention claimed is:

1. A process for producing a mixed oxide in particulate form, comprising cations of lithium and cations of at least two transition metals selected from the group consisting of nickel, cobalt, manganese, titanium, vanadium, chromium and iron, the process comprising
producing or providing spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, where the concentration of at least one of the transition metal cations in the spherical particles, plotted in each case over a radius of the spherical particle, has at least one relative extreme value which is neither in the center nor at the edge of the particle in question,
producing a mixture by mixing the spherical particles produced or provided and at least one lithium compound selected from the group consisting of $Li_2O$, LiOH, $LiNO_3$, $Li_2SO_4$, LiCl and $Li_2CO_3$,
optionally subjecting the mixture produced to further treatment,
subjecting the mixture which has been produced and has optionally been subjected to further treatment to treatment at a temperature in the range from 800° C. to 950° C., so as to form a mixed oxide in particulate form comprising cations of lithium and cations of at least two transition metals selected from the group consisting of nickel, cobalt, manganese, titanium, vanadium, chromium and iron, where, in the particles of the mixed oxide,
the concentration of the cations of at least one of the transition metals, plotted in each case over a radius of the particle of the mixed oxide, has a concentration gradient within a region from a point between 0% and 80% of the radius of the particle of the mixed oxide as far as a point between 80% and 100% of the radius of the particle of the mixed oxide,
where these two points relative to one another are separated by at least 5% of the radius of the particle mixed oxide,
the concentration of lithium cations, plotted in each case over a radius of the particle mixed oxide, is essentially constant, and wherein, in the produced or provided spherical particles of at least one compound selected from the group consisting of transition metal carbonates, transition metal hydroxides and transition metal carbonate hydroxides, the concentration of cations of a transition metal selected from the group consisting of cobalt and manganese, plotted in each case over a radius of the particle in question, is essentially constant.

2. The process according to claim 1, wherein the treatment of the mixture which has been produced and has optionally been subjected to further treatment is effected at a temperature in the range from 800° C. to 950° C. over a period of at least 6.5 hours to at most 12 hours.

3. The process according to claim 1, wherein the concentration gradient is at least 10%, based on the lowest concentration in the region of the concentration gradient.

4. The process according to claim 1, wherein the production or provision of said spherical particles of at least one compound selected from the group consisting of transition metal carbonates, transition metal hydroxides and transition metal carbonate hydroxides comprises the steps of:
  (A) providing an aqueous solution (A) of at least one compound selected from the group consisting of alkali metal carbonates, alkali metal hydrogencarbonates and alkali metal hydroxides and optionally at least one compound L selected from organic amines and ammonia,
  (B) providing at least two aqueous solutions (B1) and (B2) of transition metal salts, comprising cations of a total of at least two transition metals selected from the group consisting of nickel, cobalt, manganese, titanium, vanadium, chromium and iron, the aqueous solutions (B1) and (B2) having different molar ratios of the transition metal cations,
  (C) combining the at least one aqueous solution (A) and optionally the at least one compound L with the at least two aqueous solutions (B1) and (B2) in (C1) a stirred tank cascade comprising at least two stirred tanks or in (C2) a batch reactor, so as to precipitate spherical particles of at least one compound selected from the group consisting of transition metal carbonates, transition metal hydroxides and transition metal carbonate hydroxides, each comprising cations of at least two transition metals selected from the group consisting of nickel, cobalt, manganese, titanium, vanadium, chromium and iron, by
  (C1) feeding solutions (B1) and (B2) into various stirred tanks in the stirred tank cascade or by
  (C2) feeding solutions (B1) and (B2) at different times or in different amounts into the batch reactor
  to bring about precipitations at different transition metal concentrations, such that the concentration of at least one of the transition metal cations in the precipitated spherical particles, plotted in each case over the radius of the spherical particle, has at least one relative extreme value which is neither in the center nor at the edge of the spherical particle, and
  (D) removing the spherical particles thus precipitated.

5. The process according to claim 1, wherein, in the produced or provided spherical particles of at least one compound selected from the group consisting of transition metal carbonates, transition metal hydroxides and transition metal carbonate hydroxides, the concentration of the cations of each of at least two transition metals, plotted in each case over a radius of the spherical particle, has at least one relative extreme value which is neither in the center nor at the edge of the spherical particle in question.

6. The process according to claim 1, wherein, in the produced or provided spherical particles of at least one compound selected from the group consisting of transition metal carbonates, transition metal hydroxides and transition metal carbonate hydroxides, the concentration of the cations of at least one of the transition metals, plotted in each case over a radius of the spherical particle, has at least one turning point.

7. The process according to claim 1, wherein the produced or provided spherical particles of at least one compound selected from the group consisting of transition metal carbonates, transition metal hydroxides and transition metal carbonate hydroxides comprise cations of nickel, cobalt and manganese and optionally at least one further transition metal.

8. The process according to claim 1, wherein, in the produced or provided spherical particles of at least one compound selected from the group consisting of transition metal carbonates, transition metal hydroxides and transition metal carbonate hydroxides, the concentration of nickel, plotted in each case over a radius of the spherical particle, is within a range from 40 mol % to 80 mol %, based on the total concentration of transition metal cations in the spherical particle.

9. The process according to claim 1, wherein the produced or provided spherical particles of at least one compound selected from the group consisting of transition metal carbonates, transition metal hydroxides and transition metal carbonate hydroxides have a median diameter (D50) in the range from 1 to 30 µm.

10. A mixed oxide in particulate form, obtained by the process of claim 1,
  comprising cations of lithium and cations of at least two transition metals selected from the group consisting of nickel, cobalt, manganese, titanium, vanadium, chromium and iron,
  wherein, in the particles of the mixed oxide,
  the concentration of the cations of at least one of the transition metals, plotted in each case over a radius of the particle of the mixed oxide, has a concentration gradient within a region from a point between 0% and 80% of the radius of the particle of the mixed oxide as far as a point between 80% and 100% of the radius of the particle of the mixed oxide, where these two points relative to one another are separated by at least 5% of the radius of the particle of the mixed oxide,
  the concentration of lithium cations, plotted in each case over a radius of the particle of the mixed oxide, is essentially constant, and
  wherein, in the particles of the mixed oxide, the concentration of cations of a transition metal selected from the group consisting of cobalt and manganese, plotted in each case over a radius of the particle of the mixed oxide, is essentially constant.

11. The mixed oxide according to claim 10, wherein the concentration gradient is at least 10%, based on the lowest concentration in the region of the concentration gradient.

12. The mixed oxide according to claim 10, wherein, in the particles of the mixed oxide, the concentrations of the cations of two of the transition metals, plotted in each case over a radius of the particle in question, have a concentration gradient within a region from a point between 0% and 80% of the radius of the particle of the mixed oxide as far as a point between 80% and 100% of the radius of the particle of the mixed oxide, where the concentration of the cations of the first transition metal rises in the direction from the center to the edge of the particle of the mixed oxide and the concentration of the cations of the second transition metal falls in the direction from the center to the edge of the particle of the mixed oxide.

13. The mixed oxide according to claim 12, wherein the first transition metal is manganese and the second transition metal is nickel.

14. The mixed oxide according to claim 10, wherein the particles of the mixed oxide are secondary particles composed of agglomerated primary particles, where the secondary particles have the following properties:
the concentration of the cations of at least one of the transition metals, plotted in each case over a radius of the secondary particle in question, has a concentration gradient within a region from a point between 0% and 80% of the radius of the secondary particle in question as far as a point between 80% and 100% of the radius of the secondary particle in question, where these two points relative to one another are separated by at least 5% of the radius of the particle of the mixed oxide, and the concentration of lithium cations, plotted in each case over a radius of the secondary particle in question, is essentially constant.

15. The mixed oxide according to claim 10, which comprises cations of nickel, manganese and cobalt, and optionally at least one further transition metal.

16. The process according to claim 10, wherein, in the particles of the mixed oxide, the concentration of nickel, plotted in each case over a radius of the particle in question, is within a range from 40 mol % to 80 mol %, based on the total concentration of transition metals in the particle of the mixed oxide.

17. The mixed oxide according to claim 10, wherein the particles have a median diameter (D50) in the range from 1 μm to 30 μm.

18. A cathode comprising the mixed oxide according to claim 10.

* * * * *

UNITED STATES PATENT AND TRADEMARK OFFICE
CERTIFICATE OF CORRECTION

PATENT NO. : 10,526,212 B2
APPLICATION NO. : 15/524898
DATED : January 7, 2020
INVENTOR(S) : Christoph Erk et al.

It is certified that error appears in the above-identified patent and that said Letters Patent is hereby corrected as shown below:

In the Specification

Column 5, Line 22, after "the" delete "the".

Column 5, Lines 42-44, delete "plotted over the radius of the particle in question, the fluctuation in the concentration." and insert the same in Column 5, Line 41 as the continuation of same paragraph.

Column 12, Line 48, delete "$Co^{3+}$" and insert -- $Co^{2+}$ --.

Signed and Sealed this
Sixteenth Day of June, 2020

Andrei Iancu
*Director of the United States Patent and Trademark Office*